July 29, 1952　　　　　R. A. BOLEN　　　　　2,605,017
VACUUM SEED SELECTOR AND PLANTER
Filed Jan. 28, 1948　　　　　　　　　　　　2 SHEETS—SHEET 1

Roscoe Alonzo Bolen
INVENTOR.

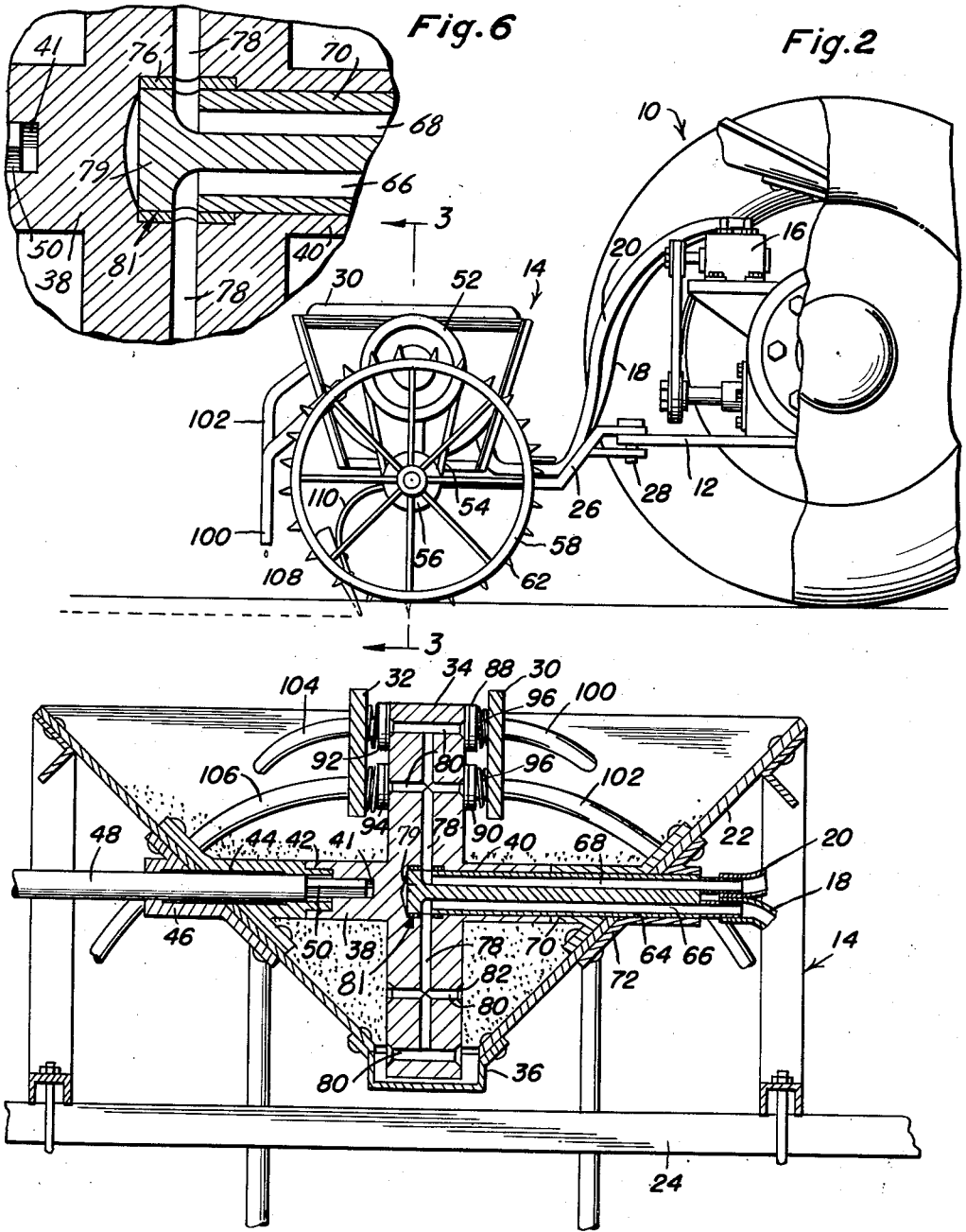

Patented July 29, 1952

2,605,017

UNITED STATES PATENT OFFICE 2,605,017

VACUUM SEED SELECTOR AND PLANTER

Roscoe Alonzo Bolen, Grand Junction, Colo.

Application January 28, 1948, Serial No. 4,727

2 Claims. (Cl. 222—11)

This invention relates to novel and useful improvements in farm implements.

An object of this invention is to raise or select a plurality of seeds from a hopper by means of suction and to eject but a single seed at a time by means of pressure.

Another object of this invention is to raise or select a plurality of seeds, positioning them in a plurality of openings, then eject the seeds from the same openings by the application of air pressure, each seed being positioned in a separate opening and ejected one by one in planting operations.

Another object of this invention is to rotate a disc having a plurality of openings through a supply of seeds, picking up a quantity of the seeds by means of a vacuum or suction, then rotate the disc farther and eject the same seeds from the openings by application of an air pressure therebehind.

Another object of this invention is to direct the seeds from the openings through a plurality of spaced conduits in order to apply or dispense the seeds in troughs or grooves in the ground.

Another object of this invention is to rotate the selector disc in accordance with the speed of the vehicle through the medium of a wheel drive.

Another object of this invention is to provide a device to be described which is easily maneuverable, being readily attachable to the rear portion of a conventional tractor.

Other objects and features of novelty will become apparent to those skilled in the art, and following the description of the preferred form of invention, illustrated in the accompanying drawings, wherein:

Figure 2 is an elevational side view of the invention showing the same attached to a conventional tractor;

Figure 3 is a sectional view taken substantially on a line 3—3 of Figure 2 and in the direction of the arrows;

Figure 1:
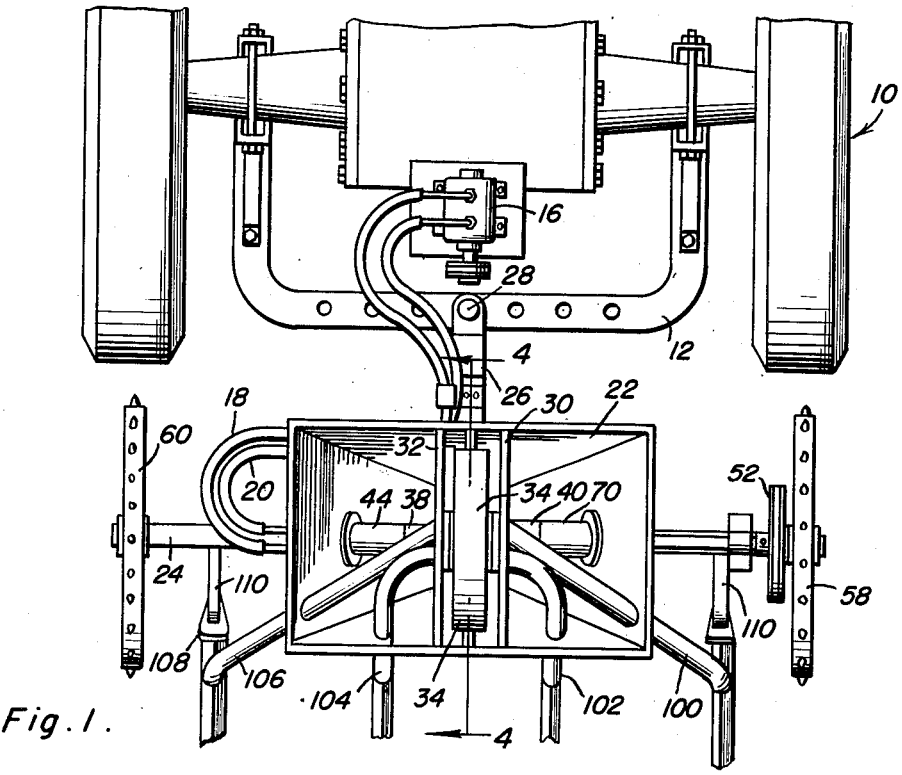
Figure 1 is a plan view of the preferred form of the invention.

One of the prime purposes of the invention is to plant seed through a unit selection of seed from a hopper through the medium of a vacuum, with or without the transference of the seed from the selector to the ground by air pressure.

The common type of planter now in use selects or meters the seed by mechanical means such as, a plate or a wheel having holes approximately the size of the seed running therebeneath under a plate or guard to scrape off the excess seed, thus leaving a single seed to be dropped by gravity to the ground. By this medium inaccurate metering is apt to result due to the fact that sometimes two small seeds will enter the slots at the same time, resulting in either dropping two seeds or crushing the seed that has only partly entered the mechanism. The irregularity of the seeds is not compensated for in such a device.

The method of carrying seeds by gravity through various sizes and shapes of tubes or openings also results in an uneven distribution of the seed to the ground.

The preferred form of the present invention includes a wheeled carriage having a selector disc therein. A suction pump may be associated with the hopper which is positioned in the wheeled carriage or cart and the exhaust side of the suction pump may also be interconnected with the said rotary disc along with the work or inlet side. Through the medium of a specially devised selector valve the suction and exhaust is transferred to selected apertures within the selector disc during a single cycle of operation. By this means seed is picked up or extracted from the hopper and rotated to another position whence it is urged rather violently through a plurality of conduits so arranged as to project the seed in the desired spaced position in the soil.

A conventional tractor is illustrated and generally indicated at 10. Of course, the usual drawbar 12 is associated with the tractor and the said drawbar is utilized in connecting a wheeled carriage or cart 14 thereto.

Suitably positioned on the tractor is a conventional suction pump 16 having conduits 18 and 20 associated with the inlet and outlet sides for ports thereof respectively.

The specific structure of the wheeled carriage or cart is not of material importance to the present invention and includes suitable angle iron bracing or the like capable of supporting a hopper 22 and an axle 24. It will be noted, however, that the wheeled carriage is so constructed as to be free of interfering braces and cross-members during the operation of the invention.

Associated with the wheeled carriage is a tongue 26 having a pin 28 extending through suitable apertures therein, which pin also extends through one of the apertures in the drawbar 12 for obtaining a driving connection.

A pair of brackets 30 and 32 respectively extend transversely across the upper portion of the hopper 22 and a rotary selector disc 34 is journalled therebetween.

This rotary selector disc projects downwardly in the hopper 22 within a specially provided closure plate 36 at the lower extremity thereof. This closure plate closes the normal aperture at the lower portion of a conventional hopper.

The said selector disc includes a pair of hubs 38 and 40 respectively extending from each face thereof. The said hub 38 has preferably a square bore 41 therein communicating with an enlarged circular bore 42. The enlarged circular bore is attached to a base supported by a bearing 44 which is attached to the side of the hopper 22. A boss 46 may be secured to the outer surface of the hopper 22 adjacent the said bearing 44. This of course, is for additional support in journalling the shaft 48.

The said shaft 48 is provided with a square terminal portion 50 complemental to the square bore 41. At the other end of the said shaft 48 there is supplied a sheave 52 having a belt 54 extending therearound. This belt also extends around a pulley 56 which is attached to a wheel 58.

The said wheel 58 is journalled on the axle 24 in the usual manner and of course, a second wheel 60 is attached to the opposite end of the axle. A plurality of protuberances 62 may be supplied on the periphery of the wheels in order to obtain greater traction in operation of the invention.

The hub 40 is journalled on a shaft 64 which has a pair of bores 66 and 68 respectively longitudinally therein. A bearing or boss 70 is secured to a side of the said hopper 22 while a backing boss 72 is attached to the same side of the hopper 22 on the outer surface thereof. By this means the selector plate 34 is rotatively mounted in said hopper.

As is seen by inspection of Figure 3 the said inlet conduit or suction pipe 18 is attached with the bore 66 while the pressure pipe or conduit 20 is attached with the bore 68.

Figures 4, 5:
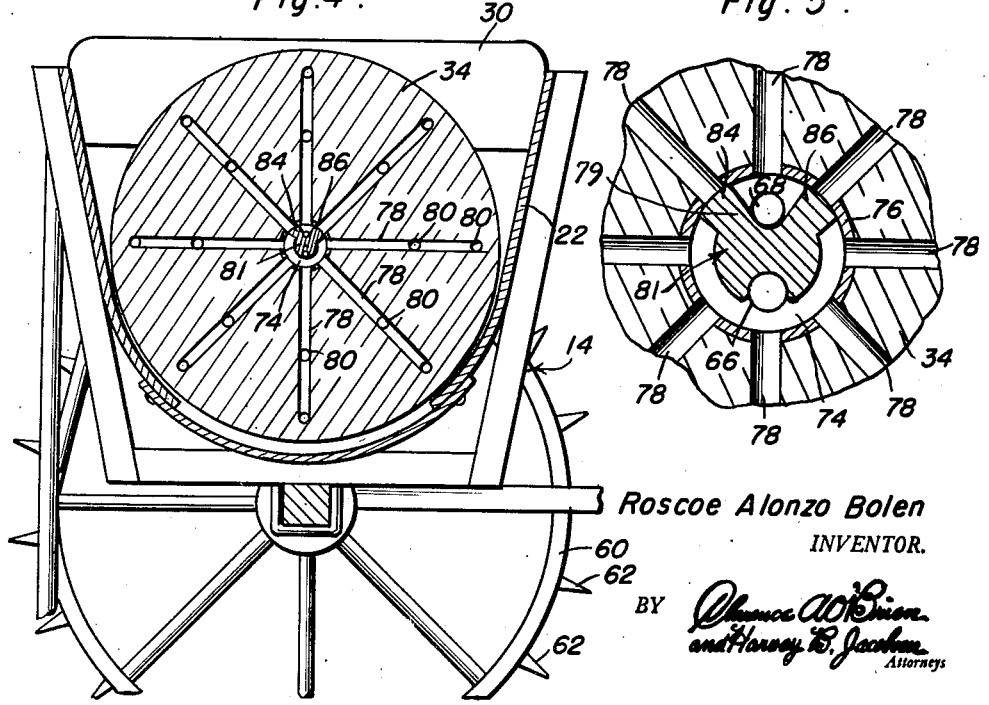
Figure 4 is a transverse sectional view taken substantially on a line 4—4 of Figure 1 and in the direction of the arrows.
Figure 5 is an enlarged sectional detail of construction illustrating the selector valve and its association with various passages in the selected disc and, Figure 6 is an enlarged fragmentary sectional view showing the selector valve and its associated passages.

Referring now to Figure 5 it will be noted that a recess 74 is supplied in the central portion of the selector plate 34 and the bores 66 and 68 respectively terminate therein. Of course, a suitable bushing 76 may be supplied about the periphery of the said recess 74 to serve as a bearing surface.

A plurality of channels 78 extend from the recess 74 radially from the said recess to suitable cross-channels 80 which terminate in the faces of the said selector plate 34.

Due to the shape of the terminal portion or plate 79 of the said shaft 64, it serves the purpose of a selector valve 81. As the selector disc 34 rotates the selector valve 81 remains relatively stationary and the lower channels 78 communicate with the suction-bearing bore 66 and the lower portion of the hopper 22. Since there is a supply of seed in this lower portion of the hopper, it is attracted within the openings formed at the ends of the channels 80. These openings may have bevelled surfaces 82 if so desired, in order to accommodate but a single seed at a time. However, it will be noted that the channels 80 are of sufficiently small diameter to accommodate only a single seed.

While the selector plate 34 is in a single position, all of the downwardly extending radial channels 78 are communicating with the suction conduit 66 as is clearly evident from an inspection of Figure 5. This, of course, is due to the shape of the selector valve plate 79.

Meanwhile, the ears 84 and 86 respectively of the said selector valve 81 close a pair of upwardly extending channels 78 and permit pressure to be applied through the bore 68 to the single upstanding channel 78. It is readily apparent that by this expedient the single pump 16 may be utilized for creating a vacuum for picking up or extracting a seed or a plurality of seeds from a supply in the hopper 22 and then for ejecting the same.

A pair of banks of plates, the plates 88 and 90 and the plates 92 and 94 forming respective banks are supplied in association with the brackets 30 and 32 respectively. These plates are resiliently biased from the cross-members through the medium of a plurality of springs 96 which not only seat on the plates but also seat on the cross-members. It is readily apparent that the plates engage the faces of the selector disc 34 and conduits 100, 102, 104 and 106 respectively extend through said brackets 30 and 32 and terminate in the plates. Of course, the seeds are projected through suitable apertures (not shown) in the said plates and through the respective conduits which terminate adjacent the ground.

Suitable plows or cultivator means 108 may be attached to the frame of the wheeled carriage 14 by means of arms 110 (see Figure 2) for digging a trench or furrow wherein the seeds are deposited from the conduits 102, 100, 104 and 106 respectively. It is apparent that certain variations may be made without departing from the spirit of the invention such as changes as to size and shape, re-arrangement of elements and all modifications falling within the purview of the following claims.

Having described the invention, what is claimed as new is:

1. A seed selector and dispenser comprising a hopper, an axle, means mounted on said hopper attaching said axle to said hopper, and wheels disposed on said axle, means for extracting and dispensing seed from said hopper including a rotatable plate disposed in said hopper and having openings therein, a recess in said plate, passages connecting said openings and said recess, means operated by one of said wheels for rotating said plate, a relatively stationary selector valve disposed in said recess for opening and closing said passages, and discharge conduits communicating with said recess, a suction pump, conduits connected with the inlet and outlet side of said pump and said recess, air conductor members disposed on the outer surfaces of said plate communicating with said openings, and resilient means reacting on said members constantly urging said members against said plate.

2. The seed selector and dispenser of claim 1 wherein said resilient means comprises a plurality of springs, said hopper having brackets extending thereacross and providing seats for said springs.

ROSCOE ALONZO BOLEN.

REFERENCES CITED

The following references are of record in the file of this patent:

UNITED STATES PATENTS

| Number | Name | Date |
| --- | --- | --- |
| 1,331,235 | Bristow | Feb. 17, 1920 |
| 1,637,834 | Oliver | Aug. 2, 1927 |
| 2,031,713 | Johnson | Feb. 25, 1936 |

FOREIGN PATENTS

| Number | Country | Date |
| --- | --- | --- |
| 512,178 | Great Britain | Aug. 30, 1939 |